K. C. NAYLOR.

Assignor of one-half interest to BENJ. L. COOK.

NUT-LOCKS.

No. 7,507. Reissued Feb. 13, 1877.

WITNESSES:
J. C. Wilcke
N. H. Sherburne

INVENTOR:
Kinzey C. Naylor
By Ridley & Sherburne
attys

UNITED STATES PATENT OFFICE.

KINZEY C. NAYLOR, OF NEW SHARON, ASSIGNOR OF ONE-HALF INTEREST TO BENJAMIN L. COOK, OF OTTUMWA, IOWA.

IMPROVEMENT IN NUT-LOCKS.

Specification forming part of Letters Patent No. 181,589, dated August 29, 1876; reissue No. 7,507, dated February 13, 1877; application filed January 27, 1877.

*To all whom it may concern.:*

Be it known that I, KINZEY C. NAYLOR, of New Sharon, in the county of Mahaska and State of Iowa, have invented certain new and useful Improvements in Nut-Locks; and I hereby declare the following to be a full, clear, and exact description thereof, which will enable others, skilled in the art to which my invention appertains, to make and use the same, reference being had to the accompanying drawing, forming part of this specification, in which—

Figure 1:
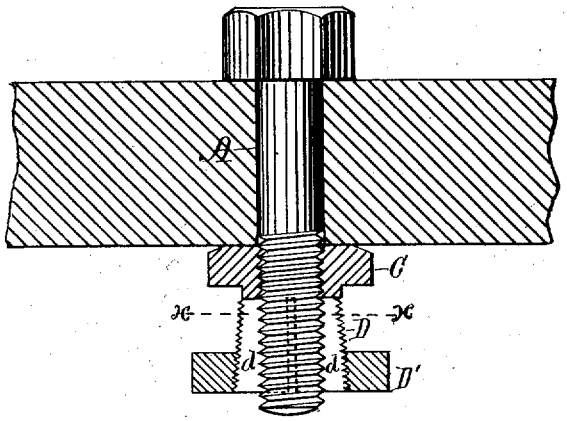
Figure 2:
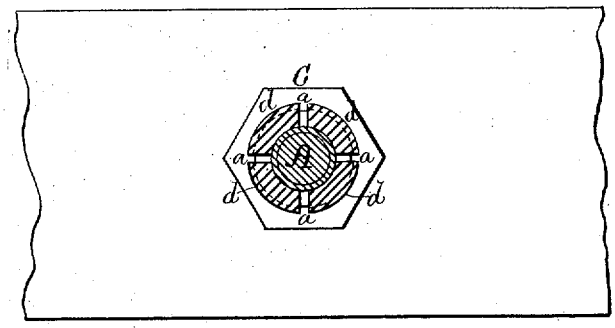
Figure 3:
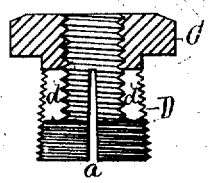

Figure 1 is a central section of the nut, showing its position when adjusted upon the bolt. Fig. 2 is a transverse section of the same, showing those parts above the line *x x*, drawn across Fig. 1; and Fig. 3 is a central section of the nut proper detached from the bolt.

Like letters of reference indicate like parts.

The object of my invention is to provide a nut so arranged as to admit of being locked in position upon the bolt by clamping the nut to the bolt, and to that end my invention consists in providing the nut proper with an elongated tapering sleeve, which is screw-threaded internally and externally, the internal thread running in an opposite direction to the external thread, in combination with a clamp-nut mounted upon said sleeve, so that when the clamp-nut is turned upon the sleeve to move it from the nut proper, it will ride up the tapering part of the sleeve and compress the same against the bolt, thereby increasing the frictional contact of the bolt and sleeve, and so as to prevent the nut proper from being turned upon the bolt, or from becoming loosened.

In the drawing, A represents the bolt, which is made of iron and of the usual construction. C represents the nut proper, which is made in any suitable form, laterally, to receive the wrench for turning the nut to its place upon the bolt. D represents an elongated sleeve, formed as a part of the nut, and projecting from the back thereof in a plane parallel with the plane of the sides of the nut, and is screw-threaded internally to correspond with the screw-thread in the nut proper and with the screw-thread on the bolt, and is slotted longitudinally as shown at *a*, and so as to form two parts or jaws, *d d*, adjusted to rest against the threaded portion of the bolt. The sleeve is also made tapering, increasing in diameter from the nut proper, or, in other words, the wall of the sleeve is made thicker at its outer end than at the junction with the nut, so that when the nut is screwed upon the bolt, the diameter of the sleeve at its outer end will exceed its diameter at its junction with the nut, and is screw-threaded externally, as shown in Figs. 1 and 3, and such exterior thread is formed in a direction opposite to the interior thread of the sleeve and nut. D′ represents the clamp-nut, which is screw-threaded internally to correspond with the exterior thread on the sleeve, and the diameter of its opening is equal to the smallest diameter of the sleeve.

In the application of my said improved nut-lock, the clamp-nut D′ is first screwed upon the sleeve D until in close proximity to the back of the nut C. The nut C is then screwed upon the bolt to the position in which it is to remain at rest, when the clamp-nut D′ is turned on the sleeve in the direction to move it from the nut C, and so as to ride up the taper of the sleeve and compress the jaws *d d* firmly between the bolt and clamp-nut, and thereby increasing the frictional contact of the several parts, and so as to prevent the nut C from being turned backward on the bolt.

The object of forming the external screw-thread on the sleeve in a direction opposite to the internal screw-thread in the sleeve and nut proper, is to prevent said nut from being turned backward on the bolt when the clamp-nut is being turned toward the outer end of the sleeve; and the object of slotting the sleeve, as described, is to allow its outer end to be more freely contracted by the action of the clamp-nut.

Having thus described my invention, what I claim as new, and desire to secure by Letters Patent, is—

1. The nut C, provided with the slotted sleeve D, the wall thereof increased in thickness at the end farthest from the nut, and screw-threaded internally and externally, in combination with the clamp-nut D′, substantially as and for the purpose specified.

2. The combination, with the clamp-nut D′, of the nut C, provided with the slotted and tapering sleeve D, having the internal screw-thread running in opposite direction to the external screw-thread, substantially as and for the purpose specified.

3. The nut C, provided with the slotted sleeve D, having the exterior screw-threads running in a direction opposite to the interior screw-threads, in combination with the clamp-nut D′, substantially as and for the purpose specified.

KINZEY C. NAYLOR.

Witnesses:
O. M. LADD,
W. M. COOK.